United States Patent
Gerritsen et al.

(10) Patent No.: US 8,509,510 B2
(45) Date of Patent: Aug. 13, 2013

(54) PROCESSING OF IMAGES IN A DIRECTION OF SUCCESSION

(75) Inventors: Frans Andreas Gerritsen, Eindhoven (NL); Marcel Breeuwer, Eindhoven (NL); Bert Leo Alfons Verdonck, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 942 days.

(21) Appl. No.: 10/071,405

(22) Filed: Feb. 8, 2002

(65) Prior Publication Data

US 2002/0126884 A1  Sep. 12, 2002

(30) Foreign Application Priority Data

Feb. 13, 2001  (EP) .................................. 01200516

(51) Int. Cl.
*G06K 9/00* (2006.01)
(52) U.S. Cl.
USPC ............ 382/131; 382/173; 382/195; 382/266
(58) Field of Classification Search
USPC ......... 382/128–134, 195, 199, 173, 266–268, 382/166–168; 345/419
See application file for complete search history.

(56) References Cited

U.S. PATENT DOCUMENTS

| | | | |
|---|---|---|---|
| 5,170,347 A * | 12/1992 | Tuy et al. ...................... | 345/419 |
| 5,297,215 A | 3/1994 | Yamagishi ........................ | 382/6 |
| 5,433,199 A | 7/1995 | Cline et al. | |
| 5,457,754 A * | 10/1995 | Han et al. ...................... | 382/128 |
| 5,474,067 A | 12/1995 | Laub | |
| 5,734,739 A * | 3/1998 | Sheehan et al. ................ | 382/128 |
| 5,782,762 A * | 7/1998 | Vining ........................... | 600/407 |
| 5,825,908 A * | 10/1998 | Pieper et al. ................... | 382/131 |
| 6,169,817 B1 * | 1/2001 | Parker et al. ................... | 382/131 |
| 6,424,732 B1 * | 7/2002 | Shiffman et al. .............. | 382/131 |
| 6,438,403 B1 * | 8/2002 | Cline et al. ..................... | 600/410 |

FOREIGN PATENT DOCUMENTS

| | | |
|---|---|---|
| EP | 0747004 B1 | 5/2000 |
| JP | 4292150 A | 10/1992 |
| JP | 6348863 A | 12/1994 |
| WO | 0026852 A1 | 5/2000 |

OTHER PUBLICATIONS

"Exploring the discrimination power of the time domain for segmentation and characterization of lesions in serial MR data" by Guido Gerig et al. in "Medical image computing and computer-assisted intervention", MICCAI '98 (W.M. Wells, A. Colchester, S. Delp, Eds., Springer 1998).
Spreeuwer, "Detection of the Myocardium Outline in Perfusion", Aug. 31, 2000, p. 1-7.

(Continued)

*Primary Examiner* — Wesley Tucker

(57) ABSTRACT

The invention relates to the processing of a series of images. A multi-dimensional data set is formed from the series of images, for example, by stacking the images in order of succession. A cut plane is taken through the stack, that is, in the direction of succession and a slice through the stack is taken along the cut plane. A region of interest is derived from the slice. The invention is particularly useful for cardiology where a stack of successive MR images of a moving heart is formed. The ventricles of the heart are accurately segmented while using the slice in the direction of the time axis.

7 Claims, 2 Drawing Sheets

(56) References Cited

OTHER PUBLICATIONS

Figure 1:
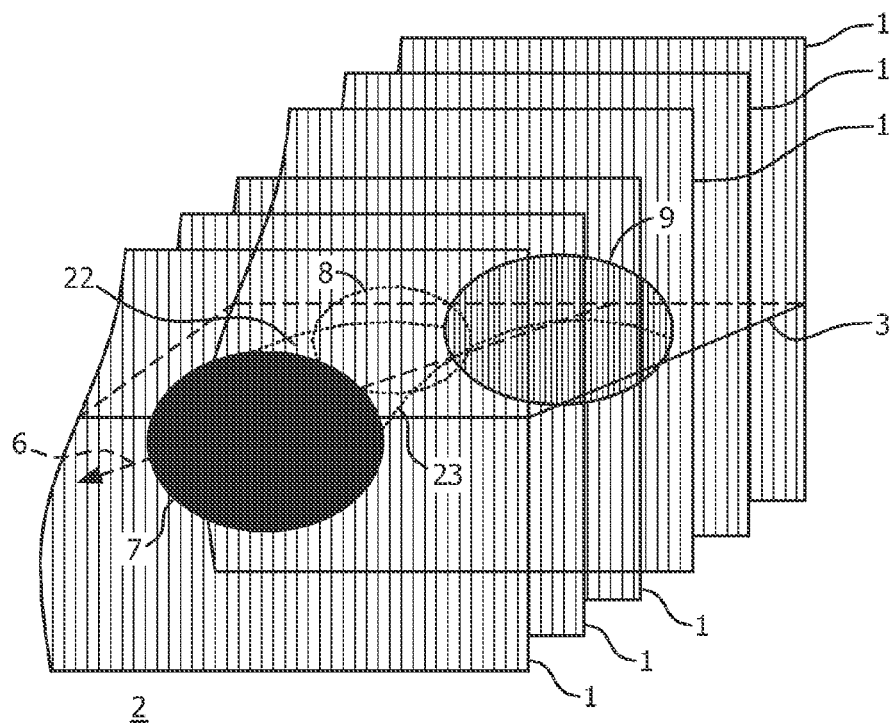

Cohen-Or et al, "Contour Blending Using Warp-Guided Distance Field Interpolation", Schook of Mathematical Sciences, XP-000704185, Oct. 27, 1996, pp. 165-172.

Calmon et al, "Automatic Measurement of Changes in Brain vol. on Consecutive 3D MR Images by Segmentation Propagation", Magnetic Resonance Imaging, vol. 18, 2000, pp. 439-453.

Rey et al, "Automatic Detection and Segmentation of Evolving Processes in 3D Medical Images: Application to Multiple Sclerosis", Automatic Detection and Segmentation of Evolving Processes, 1999, pp. 154-167.

Cootes et al, "Active Shape Models—Their Training and Application", Computer Vision and Image Understanding, vol. 61, No. 1, January 1995, pp. 38-59.

Spreeuwers, "Automatic Detection of Left and Right Ventricle From Cardiac Perfusion Image Sequences", May 30, 2000, pp. 1-12.

* cited by examiner

PROCESSING OF IMAGES IN A DIRECTION OF SUCCESSION

The invention relates to a method of processing images, in which
  individual images succeed one another in a direction of succession,
  a multi-dimensional data set is constructed from the individual images,
    which multi-dimensional data set assigns data values to positions in a multi-dimensional space,
    which multi-dimensional space is set up by the direction of succession and two directions parallel to the surface of the individual images,
  a slice through the multi-dimensional data set is reconstructed along a cut plane through the multi-dimensional space, and
  the direction of the cut plane has a component in the direction of succession.

Such a method of processing images is known from the article "Exploring the discrimination power of the time domain for segmentation and characterisation of lesions in serial MR data" by Guido Gerig et al. in "Medical image computing and computer-assisted intervention", MICCAI '98 (W. M. Wells, A. Colchester, S. Delp, Eds., Springer 1998).

The known method is applied to a series of three-dimensional (3D-MR) magnetic resonance reconstructions that succeed one another in time. Each of the 3D MR reconstructions comprises a plurality of magnetic resonance images of different slices through the 3D MR reconstruction. According to this known method the direction of succession represents the succession in time of the magnetic resonance images. The individual magnetic resonance images are formed with intervals that amount to a week or to a month. Subsequently, the successive magnetic resonance images are combined so as to form a four-dimensional (4D) (x,y,z; t) data set. In accordance with the known method a region of interest is indicated in advance in the individual magnetic resonance images. More specifically, each time the same lesion is indicated in the individual magnetic resonance images. The lesions, that is the region of interest, in the successive magnetic resonance images are registered relative to one another while compensating for motion between the successive magnetic resonance images. The mutually registered magnetic resonance images are combined so as to form the 4D data set.

In conformity with the known method the development in time of the lesion is studied by means of two-dimensional images of various profiles along lines through the 3D MR volume as a function of time. Each of these profiles represents, each time for a given spatial position, the variation in time of the brightness value in the relevant spatial position. The set of such profiles for respective positions in the successive images constitutes a slice along a cut plane in the direction of time.

It is an object of the invention to locate the region of interest more accurately and in a simpler manner from the images.

This object is achieved in accordance with the invention in that a region of interest is located on the basis of the cut plane.

The method in accordance with the invention is applied to a set of images in a given order of succession. The order of succession of the set of images is the direction in which the images succeed one another. For example, when the images have been acquired successively in time, the images are temporally successive images (images acquired later are positioned behind previously acquired images) and the direction of succession is the time axis. It is also possible to use other directions of succession, for example, successive positions of two-dimensional slices through a three-dimensional volume, successive phases in a perfusion process, or successive values of acquisition parameters. Such an acquisition parameter relates, for example, to the degree of $T_1/T_2$ contrast in a magnetic resonance image. The multi-dimensional data set is formed from the individual images as if it were by arranging the individual images so as to be "stacked one onto the other" or "arranged one behind the other" in the direction of succession. The multi-dimensional data set thus formed assigns data values, such as brightness values, from the individual images to positions in the multi-dimensional space. The dimension of the multi-dimensional space is exactly one larger than the dimension of the images. The images are, for example, two-dimensional images; in that case the multi-dimensional space is three-dimensional. It is also possible to use images in the form of volume data, for example, 3D-MR reconstructions or 3D reconstructions derived from X-ray computed tomography. The multi-dimensional space is then four-dimensional. The positions in the multi-dimensional space comprise the position in the direction of succession and the position in the image for the relevant position in the direction of succession. In accordance with the invention a slice through the multi-dimensional data set is reconstructed along the cut plane. The cut plane is a plane in its simplest form, but surfaces that are curved in the multi-dimensional space are also feasible. The slice represents the data values in the multi-dimensional data set, that is, data values arranged along the cut plane. A suitable technique for the reconstruction of the slice is, for example, the so-called "multi-planar reformatting". According to that method it is also possible to calculate, for example, by interpolation, data values in the multi-dimensional data set for positions in the direction of succession that lie between positions of succession between two successive images. The cut plane is not chosen to be oriented perpendicularly to the direction of succession; in that case the slice would actually come down to choosing the image for the relevant position of succession. Furthermore, the cut plane can be chosen in conformity with the situation of the region of interest in the one or more images. When a priori information is known concerning the regions of interest to be located, the cut plane can be oriented and positioned on the basis of said a priori information.

It has been found that the region of interest in the one or more images is particularly clearly reproduced in the slice. It is notably when said region of interest is detected each time in a plurality of individual images that the region of interest can be simultaneously determined in the respective images on the basis of the slice. The correlation between the region of interest in the successive images, for example, the time correlation, becomes very manifest in the slice that is situated at least partly in the direction of succession, for example, along the time axis.

These and other aspects of the invention will be further elaborated on the basis of the following embodiments that are defined in the dependent claims.

Preferably, the region of interest is segmented from one or more individual images on the basis of the reconstructed slice along the cut plane. Segmentation of the region of interest means that said region of interest is separated from the remainder of the relevant image. It has been found that the boundaries of the region of interest in each of the individual images appear much more clearly from the reconstructed slice along the cut plane. The edge of the region of interest often is locally vague in an individual image. Despite vagueness at the edge of the region of interest in several of the successive images, however, it has been found that considerable correlations exist between the brightness values of the successive images at the area of the vagueness. Because of these correlations, a distinct edge is visible in the reconstructed slice. This edge can, therefore, be readily located in the reconstructed slice. Using the edge in the reconstructed slice, the edge of the region of interest that is usually much vaguer in the images themselves can be determined in separate images and the region of interest can be segmented from the individual images.

The invention offers good results notably for cardiological applications of the magnetic resonance imaging method, especially for angiography; such results are achieved in particular for the segmentation of the image of the myocardium (the heart muscle) from the image of the surrounding tissue. For this MR cardio application the region of interest is, therefore, a series of temporally successive magnetic resonance images of the myocardium. The degree of perfusion of the myocardium can be accurately determined on the basis of accurate segmentations of the regions of interest, that is, the segmentations of the myocardium. It has even been found that it is possible to determine whether there are regions in which the perfusion is disturbed or even seriously disturbed. An accurate diagnosis in respect of a suspected infarct can be made on the basis of the existence of such regions of poor diffusion and of their situation. It is to be noted that the result of the image processing operation in accordance with the invention constitutes a useful technical aid for a cardiologist in making such a diagnosis.

Preferably, in accordance with the invention a plurality of slices is taken along different reconstructed cut planes through the multi-dimensional data set. Respective edges are tracked in the individual slices. The edge of the region of interest in the individual images can be determined on the basis of the locations, in the individual images, of the tracked edges in the respective reconstructed slices. For example, it has been found that each time a part of the boundary of the region of interest in each of the images is derived from individual reconstructed slices. Subsequently, the respective positions are determined from the individual reconstructed slices of the boundary in relevant image. This point is each time the point of intersection of the boundary in the relevant image and the edge in one of the cut planes. Thus, a number of positions of the boundary of the region of interest is determined, that is, one for each (or a number of, preferably the majority) of the cut planes in the relevant image. The complete boundary of the image of interest is derived from these positions, for example, by interpolation. It is also very well possible to link these positions of the boundary by hand. The result is further enhanced by utilizing a priori information, concerning, for example, the known shape of the region of interest, in deriving the complete boundary.

Figure 2:
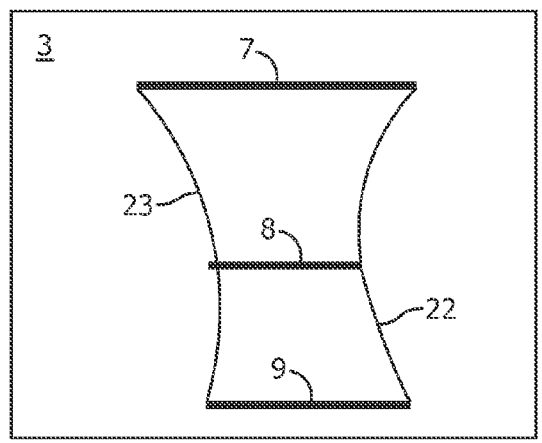
Figure 3:
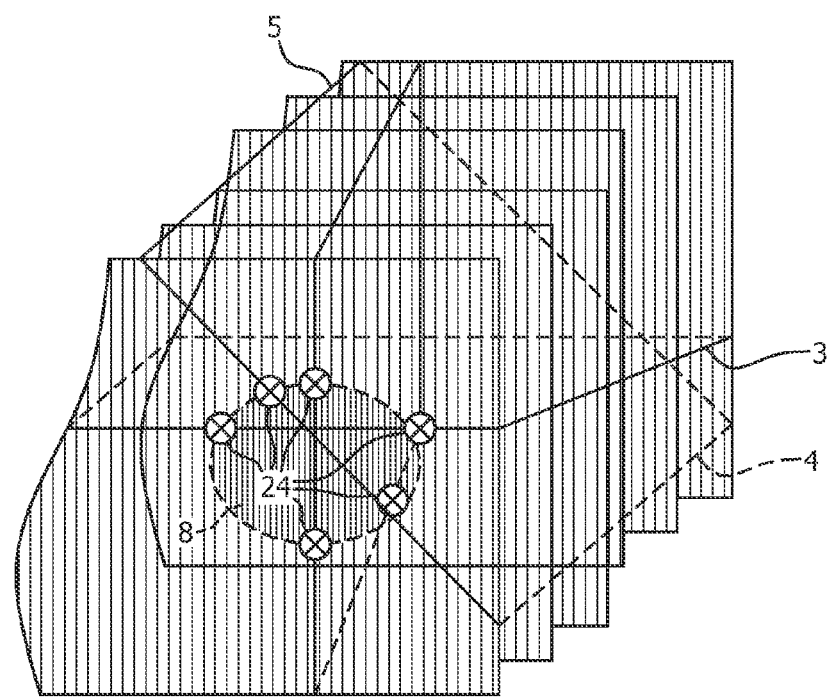

These and other aspects of the invention will be described in detail hereinafter, by way of example, on the basis of the following embodiments and with reference to the accompanying drawing; therein:

FIGS. 1 and 2 illustrate the method in accordance with the invention, and FIG. 3 illustrates the extraction of the boundary of the region of interest while utilizing a plurality of reconstructed slices.

The FIGS. 1 and 2 illustrate the method in accordance with the invention. FIG. 1 is notably a representation of the multi-dimensional data set (in this case a 3D data set) 2 that is composed of the individual images 1 that are arranged one behind the other in the direction of succession 6. This means that the images that relate to a later instant in time are shown further forwards in FIG. 1. The cut plane 3 extends approximately perpendicularly to the plane of drawing in FIG. 1. The reconstructed slice along the cut plane 3 is shown in a simple form in FIG. 2. For the sake of simplicity, the region of interest 7, 8, 9 is indicated in a few (three) individual images only.

FIG. 2 is a simplified representation of the slice along the cut plane 3. FIG. 2 notably shows the slices in the cut plane of the region of interest as shown in the three individual images of FIG. 1. FIG. 2 also shows that the region of interest in the reconstructed slice is clearly separated from image information outside said region of interest. Notably distinct edges 22, 23 can be seen in the reconstructed slice. The edge of the region of interest in each of the individual images 1 is determined on the basis of the distinct edges 22, 23 in the reconstructed slice.

FIG. 3 illustrates the extraction of the boundary of the region of interest while utilizing a plurality of reconstructed slices 3 to 5. For the sake of simplicity, FIG. 3 shows the region of interest in one of the individual images 1 only. Each of the reconstructed slices along the respective cut planes has two points of intersection 24 with the edge of the region of interest. The edge of the region of interest is accurately determined by interpolation between the points of intersection 24. Preferably, this interpolation takes into account a priori known information concerning, for example, the shape of the region of interest. For example, this a priori information concerns the expected irregularity or smooth course of contours in the images, information (static or not) concerning the expected shape of objects reproduced in the images, for example, the shape of the region of interest, and expected patterns that occur strikingly often in the vicinity of the region of interest.

The invention claimed is:

1. A method for processing images, in which individual images succeed one another in a direction of succession, the method comprising:
   constructing a multi-dimensional data set from the individual images, wherein the multi-dimensional data set assigns data values to positions in a multi-dimensional space, and the multi-dimensional space is set up by the direction of succession and two directions parallel to the surface of the individual images;
   reconstructing a slice through the multi-dimensional data set along a cut plane through the multi-dimensional space and intersecting the individual images, wherein the cut plane is oriented based on a priori information concerning a region of interest, wherein the orientation of the cut plane is non-orthogonal to the direction of succession;
   locating an edge of the region of interest in all of the individual images based on an intersection of the cut lane with the edge of the region of interest in less than all of the individual images;
   segmenting the region of interest in the individual images, wherein the segmenting is performed on the basis of (i) information in the reconstructed slice along the cut plane through the multi-dimensional data set and (ii) a location of the edge of the region of interest;
   wherein the direction of the cut plane has a component in the direction of succession, and in which a the region of interest is located on the basis of the cut plane.

2. A method of processing images as claimed in claim 1, in which respective slices through the multi-dimensional data set are reconstructed along a plurality of cut planes through the multi-dimensional space, and the directions of the individual cut planes have components in the direction of succession, individual edges are tracked in the individual slices, and the segmentation of the region of interest in the one or more images is performed on the basis of the individual locations of the respective edges found in the relevant image.

3. A method of processing images as claimed in claim 2, in which a boundary of the region of interest is derived by interpolation between the individual locations in the relevant image of the respective edges found.

4. A method of processing images as claimed in claim 3, in which the interpolation is performed inter alia on the basis of a priori information concerning the region of interest.

5. An image processing system carried out by a processor, that is arranged
   (i) to process individual images that succeed one another in a direction of succession,
   (ii) to reconstruct a multi-dimensional data set from the individual images, which multi-dimensional data set assigns data values to positions in multi-dimensional space, which multi-dimensional space is set up by the direction of succession and two directions parallel to the surface of the individual images;
   (iii) to reconstruct a slice through the multi-dimensional data set along a cut plane through the multi-dimensional space, wherein the cut plane is oriented based on a prior information concerning a region of interest, wherein the orientation of the cut plane is non-orthogonal to the direction of succession;
   (iv) to locate an edge of the region of interest in all of the individual images based on an intersection of the cut plane with the edge of the region of interest in less than all of the individual images; and
   (v) to segment the region of interest from one or more relevant images in the individual images, wherein:
      the segmentation is performed on the basis of (a) information in the reconstructed slice along the cut plane through the multi-dimensional data set and a location of the edge of the region of interest; and
      the direction of the cut plane has a component in the direction of succession, and to locate a region of interest on the basis of the cut plane.

6. A non-transitory computer readable medium storing a computer program with instructions for processing individual images that succeed one another in a direction of succession, and for:
   reconstructing a multi-dimensional data set from the individual images, which multi-dimensional data set assigns data values to positions in a multidimensional space, which multi-dimensional space is set up by the direction of succession and two directions parallel to the surface of the individual images;
   reconstructing a slice through the multi-dimensional data set along a cut plane through the multi-dimensional space, wherein the cut plane is oriented based on a prior information concerning a region of interest, wherein the orientation of the cut plane is non-orthogonal to the direction of succession;
   locating an edge of the region of interest in all of the individual images based on an intersection of the cut plane with the edge of the region of interest in less than all of the individual images;
   segmenting the region of interest from one or more relevant images in the individual images, wherein the segmenting is performed on the basis of (i) the information in the reconstructed slice along the cut plane through the multi-dimensional data set and (ii) a location of the edge of the region of interest;
   wherein the direction of the cut plane has a component in the direction of succession, and for locating a region of interest on the basis of the cut plane.

7. A medical diagnosis workstation that is provided with an image processing system as claimed in claim 5.

* * * * *